United States Patent [19]

Whitehead

[11] 4,423,881

[45] Jan. 3, 1984

[54] QUICK OPERATING CHUCK

[76] Inventor: Dennis M. Whitehead, 202 Terrace Ct., Trafford, Pa. 15085

[21] Appl. No.: 390,358

[22] Filed: Jun. 21, 1982

[51] Int. Cl.³ .......................................... B23B 31/12
[52] U.S. Cl. ...................................... 279/62; 279/60
[58] Field of Search .................. 279/60, 61, 62, 63, 279/64, 65, 1 K

[56] References Cited

U.S. PATENT DOCUMENTS

| | | | |
|---|---|---|---|
| 911,012 | 1/1909 | Jacobs | 279/62 |
| 1,476,903 | 12/1923 | McConnell . | |
| 1,513,332 | 10/1924 | McConnell | 279/62 |
| 1,705,275 | 3/1929 | Neudeck | 279/64 |
| 1,775,994 | 9/1930 | Emrick | 279/60 |
| 1,776,675 | 9/1930 | Bascom | 279/60 |
| 2,292,470 | 8/1942 | Östberg | 279/60 |
| 2,401,071 | 5/1946 | Hillberg . | |
| 2,461,628 | 2/1949 | Chadwick | 279/65 |
| 2,621,054 | 12/1952 | Kasmir | 279/61 |
| 2,684,856 | 7/1954 | Stoner . | |
| 3,506,277 | 4/1970 | Harms . | |
| 3,807,745 | 4/1974 | Bent . | |
| 3,813,827 | 6/1974 | Bloch | 279/61 X |
| 3,929,343 | 12/1975 | Wanner et al. . | |
| 4,277,074 | 7/1981 | Kilberis . | |

FOREIGN PATENT DOCUMENTS

| | | | |
|---|---|---|---|
| 496087 | 12/1952 | Italy | 279/60 |
| 612855 | 11/1948 | United Kingdom | 279/60 |

Primary Examiner—William R. Briggs
Assistant Examiner—Glenn L. Webb
Attorney, Agent, or Firm—Buell, Blenko, Ziesenheim & Beck

[57] ABSTRACT

The chuck comprises a cylindrical body portion attached to the drill motor shaft and formed with inwardly and downwardly inclined slots which holds its jaws. Those jaws carry circumferential threads on their outer surfaces. An internally threaded ring rotatable about the chuck body meshes with the teeth on the jaws and causes them to move downwardly or upwardly as the ring is rotated. The ring is provided with an external groove which is not quite fully circumferential. The chuck body and ring are enclosed by a rotatable sleeve having an internal recess in the plane of the groove only large enough to hold a ball bearing between it and the groove on the ring. The chuck body and sleeve are provided with interlocking means which prevent longitudinal displacement but permit rotational movement therebetween. The chuck is caused to grasp the drill stem by holding the sleeve in hand and starting the drill motor. Rotation of the body portion carries the ring with it until an end of the groove makes contact with the ball bearing. Further rotation of the body portion causes the jaws to move downwardly against the drill stem. The drill is released in the same way by reversing the drill motor.

5 Claims, 6 Drawing Figures

QUICK OPERATING CHUCK

This invention relates to chucks, such as drill chucks, for power operated tools. It is more particularly concerned with such chucks which rapidly lock on a drill or other tool or unlock therefrom without the use of a key.

BACKGROUND OF THE INVENTION

Power operated drills are currently produced with three-jaw drill chucks that are operated by the use of a key. The key rotates an external sleeve. That sleeve is formed with teeth cut on a bevel on the lower end of the sleeve and the key also takes the form of a bevel gear which engages the teeth of the sleeve. The key is held in position by a stub shaft projecting from its bevel gear and which is received in a hole in the chuck body. Various attempts have been made to devise chucks that lock or unlock without the use of such a key, with varying degrees of success.

THE INVENTOR'S SOLUTION TO THE PROBLEM

I have invented a chuck with requires no key and is caused to lock or unlock on the drill stem by inertial forces. My chuck comprises a cylindrical body portion attached to the drill motor shaft and formed with inwardly and downwardly inclined slots which holds its jaws. Those jaws carry circumferential threads on their outer surfaces. An internally threaded ring rotatable about the chuck body meshes with the teeth on the jaws and causes them to move downwardly or upwardly as the ring is rotated. The ring is provided with an external groove which is not quite fully circumferential. The chuck body and ring are enclosed by a rotatable sleeve having an internal recess in the plane of the groove only large enough to hold a ball bearing between it and the groove on the ring. The chuck body and sleeve are provided with interlocking means which prevent longitudinal displacement but permit rotational movement therebetween. The chuck is caused to grasp the drill stem by holding the sleeve in hand and starting the drill motor, and is released in the same way by reversing the drill motor.

DESCRIPTION OF PREFERRED EMBODIMENT

Figure 1:
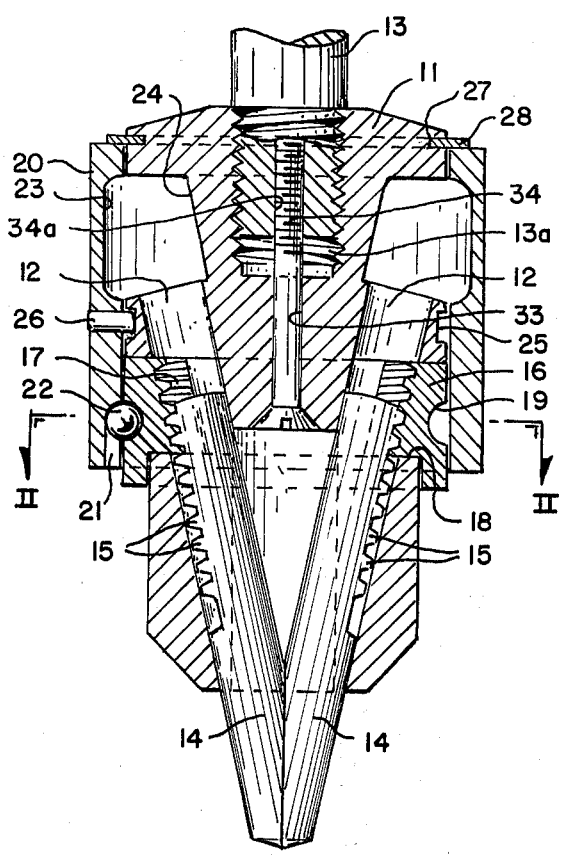
FIG. 1 is a vertical section of my device taken on the plane I—I of FIG. 2 with the chuck jaws in elevation.

My chuck comprises a cylindrical body portion 11 formed with three equally spaced longitudinal slots 12 which are inclined downwardly and inwardly. Body portion 11 has a shaft receiving portion 13a at its upper end which may be threaded as shown to receive the threaded shaft 13 of a drill motor. An opening 33 in body portion 11 accommodates a threaded screw 34 which is engaged with a threaded opening 34a in shaft 13. The threaded engagement of screw 34 in opening 34a is of the opposite hand to that of shaft 13 in opening 13a, whereby the chuck is locked to the drill motor shaft and will not unscrew when reversing and backing a drill from a hole. Each slot 12 accommodates a jaw 14, the lower ends of which are conventionally formed to grip a drill stem. Each jaw 14 carries external teeth 15 which are portions of a tapered circumferential thread. A ring 16 carrying a tapered internal thread 17 fits in a groove 18 around the exterior of chuck body 11 so that thread 17 meshes with the teeth 15 of the jaws 14. A groove 19 extends around the entire exterior circumference of ring 16 except for a barrier portion 29 which forms stops for each end of groove 19.

A cylindrical sleeve 20 surrounds body portion 11 and ring 16, the bottom face of sleeve 20 extending somewhat below groove 19 of ring 16. In that bottom face extending upwardly is a recess 21 just large enough and shaped to accommodate a ball bearing 22 and hold it in groove 19. Recess 21 is hemispherical except for its lower portion, which is open to permit assembly of my chuck. The upper internal surface 23 of sleeve 20 is circumferentially recessed as shown to allow room for the upper ends of jaws 14 when they are retracted, and body 11 is also circumferentially recessed at 24 for the same purpose.

The elements of my chuck above described may be held together in either of two ways. Body portion 11 may be formed with a circumferential groove 25 and the wall of sleeve 20 bored to receive a pin 26 which projects into groove 25 so as to permit relative rotary motion between body 11 and sleeve 20 but prevent longitudinal movement between them. Or the upper end of body 11 may have a circumferential slot or groove 27 flush with the upper surface of sleeve 20 into which slot a C-ring 28 is fitted to extend over a portion of that upper face.

Figure 3:
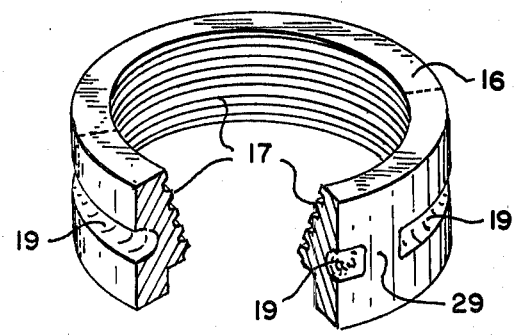
FIG. 3 is an isometric view of the threaded ring of my chuck partly broken away.
Figure 4:
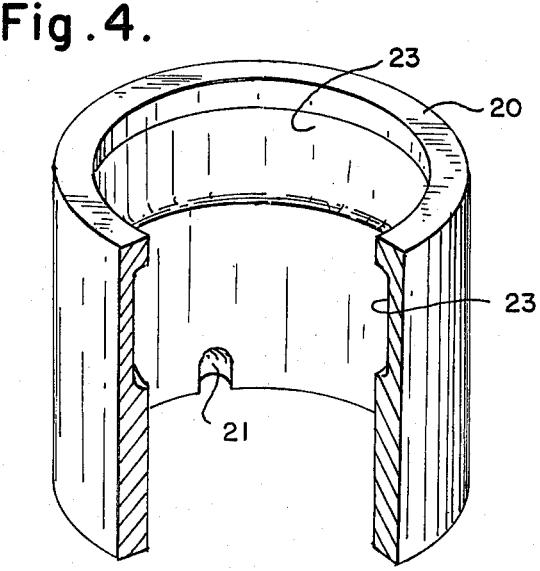
FIG. 4 is an isometric view of a sleeve of my chuck partly broken away.

In order to assemble my chuck I split ring 16 into two pieces by fracturing or other means, as shown by the broken lines in FIG. 3, and fit the pieces around jaws 14. Preferably I weld the portions of my ring 16 together after that assembly.

Figure 2:
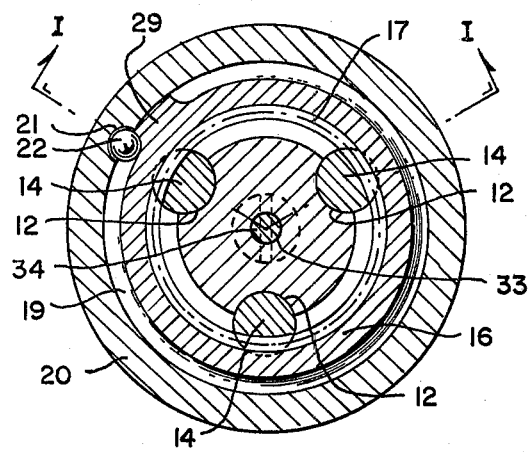
FIG. 2 is a horizontal section of the chuck of FIG. 1 taken on the plane II—II thereof.

The operation of my chuck is evident from the foregoing description. When it is desired to clamp a drill stem in the open jaws 14 the sleeve 20 is held manually and the drill motor started thus rotating body portion 11 with respect to ring 16. Jaws 14 will be moved against the drill stem by that rotation and ring 16 will begin to rotate with body portion 11. If the elements of my apparatus are in the position shown in FIG. 2 at that time, ring 16 will rotate with respect to sleeve 20 until its barrier portion 29 strikes ball bearing 22 which is captive in sleeve 20. Because of the restraint on sleeve 20 and its inertia, ring 16 will be abruptly slowed or stopped by this impact while body portion 11 continues to rotate, and jaws 14 will thus be locked against the drill stem. The impact will be maximum if the elements of my device are initially in the position shown in FIG. 2 and best results are obtained by rotating the sleeve 20 by hand to bring them into that position before starting the drill. The chuck is released from the drill stem in the same manner by reversing the drill motor and holding sleeve 20 manually. It is advantageous to thicken the wall of sleeve 20 so as to increase its inertia.

Figure 6:
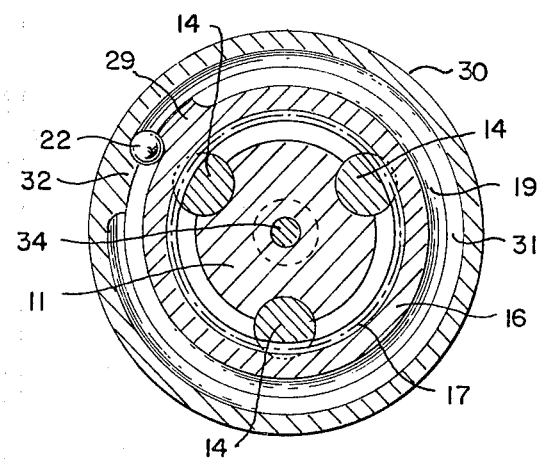
FIG. 6 is a horizontal section of the modified embodiment of my chuck taken on the same plane as FIG. 2.
Figure 5:
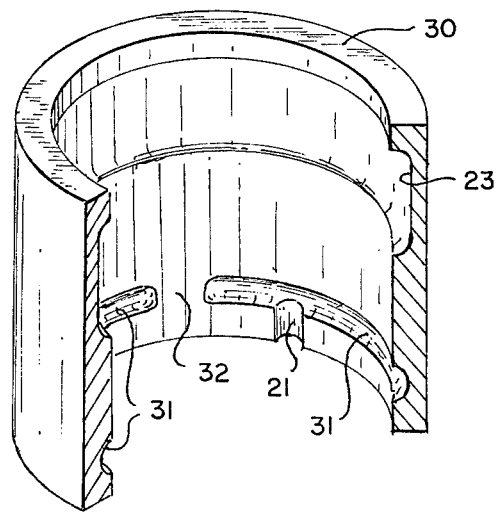
FIG. 5 is a like isometric view of a sleeve of a modified embodiment of my chuck.

A second embodiment of my invention is shown in FIGS. 5 and 6. Like parts of the two embodiments have like reference characters. The only difference between the two embodiments lies in the modification of sleeve 20 into sleeve 30. In sleeve 30 recess 21 now opens at its upper end into internal circumferential groove 31 which extends around the entire circumference of sleeve 30 except for a barrier portion 32 which forms stops for each end of that groove. Groove 31 mates with groove 19 in ring 16 to accommodate ball bearing 22. Barrier 29 in ring 16 and barrier 32 in sleeve 30 can pass each other when sleeve 30 is rotated on ring 16.

The operation of my second embodiment is similar to that of my first embodiment. To chuck a drill stem the operator holds sleeve 30 manually and starts the drill motor, causing body 11 to rotate as before. Jaws 14 will be forced against the drill stem by that rotation and ring 16 will then begin to rotate. If the elements of my modified apparatus are in the position shown in FIG. 6 at that time, ring 16 will rotate with body 11 away from ball bearing 22. After one complete turn of ring 16 barrier 29 will pick up ball bearing 22 and carry it around in groove 31 another turn until it strikes barrier 32. Because of the restraint on sleeve 30 and its inertia, ring 16 will be abruptly slowed or stopped relative to body portion 11 and chuck jaws 14 will be locked against the drill stem. The extra revolution of ring 16 with respect to sleeve 30 provided by my second embodiment considerably increases the force of the impact on it.

While I have shown and described a present preferred embodiment of the invention and have illustrated a present preferred method of practicing the same, it is to be distinctly understood that the invention is not limited thereto but may be otherwise variously embodied within the scope of the following claims.

I claim:

1. In a quick operating chuck having a body portion with a plurality of longitudinal slots therein, a plurality of tool-gripping elements slidably positioned one in each slot and having circumferential threads on their exterior surfaces, a ring encircling the tool-gripping elements internally threaded to mesh with the threads of the tool-gripping elements, a rotatable sleeve surrounding the ring and means fixing the sleeve to the body portion against longitudinal movement therebetween, the improvement comprising a circumferential groove extending around the major portion of the exterior of the ring and captive means carried by the sleeve extending into the circumferential groove.

2. The chuck of claim 1 in which the means fixing the sleeve to the body portion comprise a circumferential groove in the body portion and a pin in the sleeve extending into the groove.

3. The chuck of claim 1 in which the means affixing the sleeve to the body portion comprise a groove in the body portion flush with the corresponding end of the sleeve and a C-ring fitted in that groove.

4. The chuck of claim 1 in which the captive means carried by the sleeve comprise a ball bearing positioned in a recess in the sleeve so as to rotate with the sleeve.

5. The chuck of claim 1 in which the rotatable sleeve has a circumferential groove extending around the major portion of its interior mating with the groove in the ring and the captive means comprise a ball bearing rotatably positioned in the mating grooves of ring and sleeve.

* * * * *

UNITED STATES PATENT AND TRADEMARK OFFICE
CERTIFICATE OF CORRECTION

PATENT NO. : 4,423,881

DATED : January 3, 1984

INVENTOR(S) : DENNIS M. WHITEHEAD

It is certified that error appears in the above-identified patent and that said Letters Patent is hereby corrected as shown below:

Column 1, line 25, after "chuck", "with" should be --which--.

Signed and Sealed this

Third Day of April 1984

[SEAL]

Attest:

GERALD J. MOSSINGHOFF

Attesting Officer

Commissioner of Patents and Trademarks